March 17, 1970 D. E. GRIFFEY 3,501,590
TRANSISTOR PROTECTION CIRCUIT
Filed Nov. 3, 1966
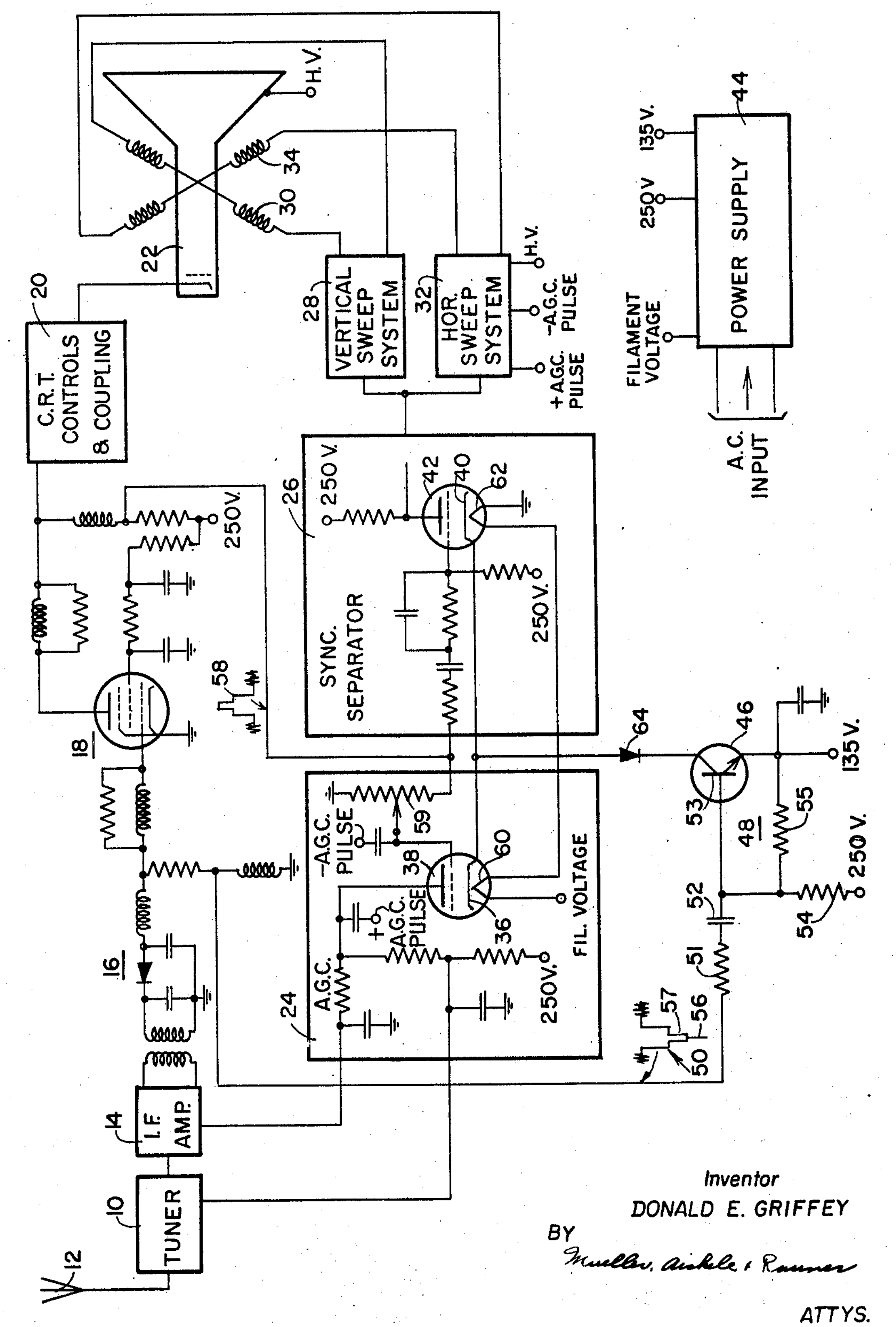
Inventor
DONALD E. GRIFFEY
BY
Mueller, Aichele & Rauner
ATTYS.

United States Patent Office 3,501,590

Patented Mar. 17, 1970

3,501,590
TRANSISTOR PROTECTION CIRCUIT

Donald E. Griffey, Skokie, Ill., assignor to Motorola, Inc., Franklin Park, Ill., a corporation of Illinois Filed Nov. 3, 1966, Ser. No. 591,799
Int. Cl. H04n 5/08, 5/56
U.S. Cl. 178—7.3 6 Claims

ABSTRACT OF THE DISCLOSURE

The circuit utilizes a diode to connect a transistor to the cathode of a vacuum tube so that a voltage of undesirably large amplitude is avoided across the transistor if the cathode is shorted to the filament in the tube.

This invention relates generally to systems utilizing a transistor in combination with a vacuum tube and more particularly to a circuit for protecting the transistor in the presence of a short in the tube.

In the last several years, the electronics industry has experienced a shift away from the use of vacuum tubes. For many well-known reasons such as size, reliability and cost, transistors are being employed to a greater extent in virtually all phases of electronics. However, today there still exists many applications in which transistors cannot replace vacuum tubes because either the characteristics or capabilities of a transistor is not adaptable to a particular environment. Also, electronics in general is in a state of flux so that when a new transistorized circuit is developed, it may find use in a system consisting of vacuum tubes. These are two examples which illustrate possible environments where both vacuum tubes and transistors may be interconnected.

However, a problem which exists when a tube is DC coupled to a transistor arises from the fact that high voltages are generally employed in the former which could appear across the transistor during an abnormal condition thereby subjecting the transistor to the possibility of damage. An example of such a condition is a short from the cathode electrode to the heater filament of the electron tube.

These problems are particularly important in a television set having an automatic gain control (AGC) system employing a vacuum tube and having its cathode supplied by a DC potential through a transistorized circuit. In order that the AGC properly respond to the television signal, it is necessary that the cathode voltage be relatively high thereby necessitating a high voltage on the transistor. If due to improper manufacture of the electron tube, for example, the cathode is shorted to its heater filament, a large voltage may appear across the transistor thereby damaging it.

It is, therefore, an object of this invention to provide a direct current coupling circuit between the cathode electrode of a vacuum tube and a transistor which serves to isolate one from the other when the cathode becomes shorted to its heater filament.

Another object is to DC couple a transistor and a vacuum tube without subjecting the transistor to damage in the presence of an abnormal condition in the vacuum tube.

The drawing illustrates a television receiver partially in block and partially in schematic incorporating the features of the invention.

In brief, one of the electrodes of a transistor is DC coupled through a circuit to the cathode of a vacuum tube and another electrode of the transistor is coupled to a DC reference potential so that the transistor provides a DC conductive path for the vacuum tube. The cathode electrode of the tube may become shorted to a potential of a polarity and magnitude with respect to the DC reference potential to damage the transistor. The circuit coupling the tube to the transistor includes a diode poled to isolate the transistor from the cathode electrode during such a shorted condition so as to protect the transistor.

Referring to the drawing, tuner 10 amplifies an RF signal appearing at antenna 12 and converts it into an intermediate frequency signal. After amplification in IF amplifier 14, the signal is processed by detector 16 which develops a demodulated composite video signal to be amplified by video amplifier 18 and translated through the CRT controls and coupling circuit 20 to the cathode of cathode ray tube 22. A portion of the video signal is applied to automatic gain control (AGC) system 24 which generates DC control potentials indicative of the strength of the received television signal. The control potentials are then applied to the amplifying devices in tuner 10 and IF amplifier 14 for the gain regulation thereof. The demodulated television signal is also coupled to sync separator system 26 which separates the synchronizing signal components from the composite video signal. The vertical synchronizing components are applied to the vertical sweep system 28, which develops and applies a sawtooth wave current signal to the magnetic deflection yoke 30 on the cathode ray tube 22 for vertical scanning. The horizontal components are applied to horizontal sweep system 32, which develops a suitable sawtooth scanning current in the magnetic deflection yoke 34 for horizontal deflection as well as providing high voltage to the screen of cathode ray tube 22 and gating pulses for AGC system 24.

A reference potential of 135 volts for cathode 36 of AGC electron tube 38 and cathode 40 of sync separator tube 42 is supplied from a power supply 44 through the collector to a transistor 46 in noise cutoff circuit 48. The video signal 50 is coupled from the output of detector 16 through resistor 51 and capacitor 52 to the base 53 of transistor 46. A pair of resistors 54 and 55 connected to the base and emitter of transistor 46 are provided to bias the transistor and allow the 135 volts to appear on the respective cathodes. The bias is adjusted so that if a noise pulse 56 appears on the negative-going video signal 50 which exceeds the amplitude of the synchronizing pulse 57, the transistor 46 will be cut off and since the transistor provides the sole DC conductive path for the tube, the 135 volts is isolated from the respective cathodes thereby turning off AGC system 24 and sync separator circuit 26 so that the output of both is independent of the noise.

The positive-going video signal 58 is applied through an adjustable potentiometer 59 to the grid of AGC vacuum tube 38. It is to be noted that since detector 16 is direct current coupled to the tube 38, the average brightness component of the demodulated signal is maintained. Thus, it is necessary that the cathode 36 be maintained at a relatively high potential of say 135 volts in order to cause the tube 38 to react only to the peaks of the video signal 58.

Filaments 60 and 62 in tubes 38 and 42, respectively, are connected in series to ground and are energized by a filament voltage from power supply 44. If either or both of the cathodes are accidentally shorted to ground or at least to a potential somewhat less than the reference potential of 135 volts then without diode 64, a large voltage will appear between the collector and emitter electrodes of transistor 46 which may be beyond its breakdown voltage thereby subjecting it to damage or even destruction. Such a large voltage may also result from a short between a cathode and its respective heating element due to loose elements in the tube, arcing, or improper manufacture so that the spacing between the elements is too close. In order to alleviate this, a diode 64 is connected between the collector of transistor 46 and the cathodes of the vacuum tubes. The diode is poled so that with no short, the 250 volts from power supply 44 causes current to flow through the plate to cathode of each tube, through the anode 64 and through transistor 46 to the 135 volt supply. If a cathode shorts to its filament or to some other voltage less than the reference potential on the emitter of transistor 46, the diode 64 becomes reversed biased thereby isolating the voltage on the shorted cathode from transistor 46 so that it cannot have a damaging voltage across it. When the short is removed, the diode will be forward biased thereby allowing the 135 volts to appear on the cathodes. It is to be noted that the diode may be economically selected to be a high power type so as to withstand the large reverse voltage across it whereas using a high power transistor in the noise cutoff circuit 48 may involve a much higher cost.

The specific values given to various voltages used in the circuit of the invention are intended to merely illustrate the magnitudes which may arise, and they should not be interpreted as limiting the scope of the invention. It will also be appreciated that although the protection diode 64 has been explained for use in a noise protection scheme for vacuum tubes in the AGC and sync separator circuits of a television set, such a circuit may be used in any signal processing circuit where a transistor and a vacuum tube are direct current coupled to one another.

What has been described, therefore, is a circuit for a transistor-vacuum tube combination to protect the transistor during a shorted condition of the tube.

What is claimed is:

1. A circuit for connecting a transistor to a cathode of a vacuum tube wherein the transistor is protected from a short of the filament to the cathode in the vacuum tube, including in combination; a vacuum tube having filament and cathode electrodes which are subject to become shorted together, said tube utilizing a direct current cathode potential of substantial amplitude and a filament potential of substantially different amplitude than said cathode potential, first power supply means for supplying said cathode potential, second power supply means connected to said filament electrode for supplying said filament potential, a transistor having common, output and control electrodes, first circuit means connecting said output electrode to said cathode electrode, said first power supply means being connected to said input electrode, second circuit means for supplying an electrical signal to control said tube, said second circuit means being connected to said control electrode of said transistor thereby allowing said electrical signal to render said transistor conductive to apply said cathode potential to the tube, said first circuit means including a diode poled to electrically isolate said output electrode from said cathode when said cathode and filament electrodes become shorted together.

2. The circuit of claim 1 wherein said vacuum tube is included in a synchronization pulse separator system of a television receiver, said second circuit means is the video detector of said television receiver, said electrical signal is a television signal subjected to being accompanied by noise pulses exceeding the amplitude thereof, said transistor is a direct current path for the cathode current of said tube, and further including in the combination, means for biasing said transistor so that only said noise pulses cause the conductive path through said transistor to in effect open circuit whereby said synchronizing pulses from said pulse separator are rendered non-responsive to said noise pulses.

3. The circuit of claim 1 wherein said vacuum tube is included in an automatic gain control circuit of a television receiver, said second circuit means is the video detector for said television receiver, said electrical signal is a television signal subject to being accompanied by noise pulses exceeding the amplitude thereof, said transistor is a direct current path for cathode current in said tube, and further including in the combination, means for biasing said transistor so that only said noise pulses cause the conductive path through said transistor to in effect open circuit, whereby the automatic gain control signal is rendered non-responsive to said noise pulses.

4. In a television receiver including a signal amplifier for translating a television signal having synchronizing components subject to being accompanied by unwanted noise pulses exceeding the amplitude of the synchronizing components, an automatic gain control system responsive to the television signal to develop a control signal for regulating the gain of the signal amplifier, a sync separator system responsive to the television signal to develop separated synchronizing components, the combination of; a first vacuum tube having a first cathode in the automatic gain control system, a second vacuum tube having a second cathode in the sync separator system, said first and second cathodes being direct current coupled to one another, a transistor for controlling said vacuum tubes and having control, output, and common electrodes, means connecting said common electrode to a direct current reference potential, circuit means direct current connected between said first and second cathode electrodes and said output electrode so that said transistor forms the sole direct current conductive path for said vacuum tubes, means coupling the television signal to said control electrode, means for biasing said transistor so that only noise pulses exceeding the amplitude of the pulse components cause the conductive path for said vacuum tubes to open circuit, whereby the control signal from the automatic gain control system and the separated synchronizing components from the sync separator system are non-responsive to the noise pulses, said cathode electrodes of the respective vacuum tubes subject to become shorted to a further potential of a polarity and magnitude with respect to said direct current reference potential tending to damage said transistor, said circuit means including a diode poled to isolate said output electrode from said cathode electrodes when either of the cathode electrodes becomes shorted to said further potential.

5. The television receiver according to claim 4, said vacuum tubes having associated filament elements, means to supply an energizing voltage to said filaments, said cathode electrodes subject to become shorted to an associated filament, the potential difference between the filament voltage and said direct current reference potential being of a magnitude to damage said transistor.

6. The television receiver according to claim 4, said transistor being an NPN conductivity type, said common and output electrodes being respectively emitter and collector electrodes, said diode having an anode and a cathode, said cathode of said diode coupled to said collector electrode and said anode coupled to said cathodes of said vacuum tubes.

References Cited

UNITED STATES PATENTS

| | | | |
|---|---|---|---|
| 3,109,061 | 10/1963 | Kramer | 178—7.3 |
| 3,134,033 | 5/1964 | Cepuch et al. | 307—202 |
| 3,152,281 | 10/1964 | Robbins | 315—201 |

ROBERT L. GRIFFIN, Primary Examiner

R. L. RICHARDSON, Assistant Examiner

U.S. Cl. X.R.

307—202, 316; 315—101; 317—33